(12) United States Patent
Park (10) Patent No.: US 7,576,842 B2
(45) Date of Patent: Aug. 18, 2009

(54) RANDOM-TYPE IDENTIFYING MATERIAL, 3-D IDENTIFYING SYSTEM AND METHOD USING THE SAME

(76) Inventor: Kwang-Don Park, 1513-205 Hanarcum Apt., 392, Sang-dong, Wonmi-gu, Bucheon-si, Gyeonggi-do, 420-030 (KR)

( * ) Notice: Subject to any disclaimer, the term of this patent is extended or adjusted under 35 U.S.C. 154(b) by 306 days.

(21) Appl. No.: 10/563,236

(22) PCT Filed: Jul. 1, 2004

(86) PCT No.: PCT/KR2004/001606

§ 371 (c)(1),
(2), (4) Date: May 3, 2006

(87) PCT Pub. No.: WO2005/004039

PCT Pub. Date: Jan. 13, 2005

(65) Prior Publication Data

US 2006/0268259 A1    Nov. 30, 2006

(30) Foreign Application Priority Data

Jul. 4, 2003   (KR) .................. 10-2003-0045278
Jul. 16, 2003  (KR) .................. 10-2003-0048723

(51) Int. Cl.
*G06K 9/74* (2006.01)
(52) U.S. Cl. .................. 356/71; 356/73; 356/335; 356/336; 382/128; 382/167; 382/170
(58) Field of Classification Search ............. 356/71–73, 356/335, 336, 341; 382/128–134, 167–170
See application file for complete search history.

(56) References Cited

U.S. PATENT DOCUMENTS

| | | | | |
|---|---|---|---|---|
| 6,774,986 | B2 * | 8/2004 | Laskowski | 356/71 |
| 6,970,236 | B1 * | 11/2005 | Markantes et al. | 356/71 |
| 2007/0170257 | A1 * | 7/2007 | Haraszti | 235/454 |

FOREIGN PATENT DOCUMENTS

| | | |
|---|---|---|
| CN | 2365711 Y | 2/2000 |
| CN | 1337645 A | 2/2002 |

* cited by examiner

*Primary Examiner*—L. G Lauchman
*Assistant Examiner*—Iyabo S Alli
(74) *Attorney, Agent, or Firm*—John K. Park; Park Law Firm

(57) ABSTRACT

The present invention relates to a random type recognition object for an identification apparatus wherein identification particles are distributed irregularly within a 3D shape and a positional value and a characteristic value of the identification particles distributed within the 3D shape in one or plural directions are recognized by separate recognition means, and an identification apparatus and method using a random type recognition object whose reproduction is impossible. Furthermore, the present invention relates to a product authentication system and method in which a purchaser transmits data extracted from a recognition object distributed together with a product using a recognition apparatus to an authentication system in order to determine whether purchased product is genuine, the authentication system transmits information on a product coincident with the received data to the purchaser, and the purchaser compares the purchased product with the information on the product received from the authentication system to determined whether the product is genuine.

11 Claims, 6 Drawing Sheets

RANDOM-TYPE IDENTIFYING MATERIAL, 3-D IDENTIFYING SYSTEM AND METHOD USING THE SAME

TECHNICAL FIELD

The present invention relates to a random type recognition object whose reproduction is impossible, and an identification apparatus and method using the random type recognition object. More particularly, the present invention relates to a random type recognition object for an identification apparatus wherein identification particles are distributed irregularly within a 3D shape, and a positional value and a characteristic value of the identification particles distributed within the 3D shape are recognized from one or a plurality of directions by separate recognition means, a 3D identification apparatus including a random type recognition object having identification particles distributed irregularly within the 3D shape and recognition means for recognizing the positional value of the identification particles distributed in the random type recognition object from one or a plurality of directions on an orthogonal coordinate, and a 3D identification method using the same.

Furthermore, the present invention relates to a product authentication system and method wherein whether a product purchased by a purchaser is genuine is determined through a network including the Internet whereby a commercial transaction order is established and the purchaser is protected from an imitation.

BACKGROUND ART

In a number of social activities such as various business transactions including product guarantee and contract, an entrance and exit procedure, an access procedure on information, etc., a process for validating things, authority or a person himself or herself is very important.

In the past, whether a product is genuine was validated based on a label, a warranty, etc., which are attached to a product. Also, whether a person is genuine is validated based on an identification card or a seal, etc. which are held by the person. Furthermore, the entrance and exit procedure is controlled using various keys. With the development of technology, reproduction technology makes progress. Thus, there is an increasing need for recognition means whose reproduction is difficult. To keep up with this trend, a variety of recognition means such as keys having barcode, a smart code, a magnetic card or an IC chip built therein and various technologies using human physical characteristics such as fingerprint, iris and face recognition have been developed.

However, the barcode, the IC chip, etc. are problematic in security since they can be reproduced. A recognition system using a physical characteristic such as fingerprint recognition is difficult to reproduce but has a problem in its use (the number of users, the use time, the use space) because some of the human body is used as a recognition object.

In addition, a consumer purchases a product through various paths, i.e., e-commerce through the Internet, departments, shops, direct transaction between consumers and so on. However, there is no method for determining whether a product purchased by the consumer is genuine. Thus, there was no choice but to determine whether the product is genuine based on information provided by a seller. Meanwhile, an imitation similar to a curio, in particular, imitations of a watch, a handbag, a golf goods, foreign liquors, etc. are in circulation in some countries in the world. Therefore, it causes damage to innocent consumers and becomes problematic in determining whether the product is genuine.

In order to prevent this imitation, conventionally, whether a product is genuine is validated based on a label, a warranty, etc. that are attached to the product. However, with the advancement of technology, reproduction technology makes progress and such recognition means is also reproduced. It thus becomes more difficult to determine whether a product is genuine.

In addition, as a solution for such security authentication and curio validation, there was disclosed U.S. Pat. No. 4,767, 205 entitled "a combination for Security Authentication and Security Authentication Method. The US patent discloses that a combination of a size, shape or color of microbead of a micron unit is used for security authentication.

In other words, information on the size, shape and color of the microbead formed randomly is compared with each other and is used for security authentication, curio validation, etc.

For example, it is assumed that an original document is written. An combination is produced at a predetermined location on the original document. First authentication information on the size, shape and color of a microbead constituting the combination is then acquired using a microscope. If whether the document is genuine becomes problematic, the size, shape and color of the microbead constituting the combination on the document are perceived using a microscope and are then compared with the first authentication information, to determine whether the document is genuine.

It can be said that this method is relatively advantageous in preventing counterfeiting as compared with a conventional label or warranty, but still has the following problems.

In other words, in this method, 2D information on a plane about the size, shape and color of the microbead constituting the combination that is generated randomly is perceived by means of the microscope. It is thus possible to counterfeit the 2D information like the conventional barcode or label.

It only needs more elaborate technology upon counterfeiting in that a microbead of micro unit that is invisible to the naked eye is used.

Moreover, in the aforementioned US patent, the size, shape and color of the microbead constituting the combination that is randomly generated are perceived by the microscope and are then compared with the stored first authentication information. It is thus inevitable that the speed of authentication is significantly low.

Furthermore, the US patent has a significant limitation to an authentication place. This is because the US patent does not disclose separate means such as the Internet through which the stored first authentication information can be accessed. In the prior art, authentication is possible only at a place where the first authentication is secured and is validated.

DISCLOSURE OF INVENTION

Accordingly, the present invention has been made in view of the above problems, and it is an object of the present invention to provide a random type recognition object, which can be easily fabricated, is impossible to reproduce and can be used for various purposes such as security authentication, curio validation and identity validation.

Another object of the present invention is to provide a 3D identification apparatus using a random type recognition object whose reproduction is impossible, and identification method using the same.

Still another object of the present invention is to provide a 3D identification apparatus using a random type recognition object whose use range such as the number of a user, the use time and the use space is not limited, and identification method using the same.

Further another object of the present invention is to provide a product authentication system and method, wherein a consumer is protected from an imitation and a business transaction order is established in such a manner that the consumer determines whether a purchased product is genuine through a network including the Internet.

Still another object of the present invention is to provide a product authentication system in which whether a product is genuine is validated using a recognition object that can be easily fabricated and cannot be reproduced.

To achieve the above objects, according to the present invention, there is provided a 3D identification apparatus using a random type recognition object, including: a random type recognition object having identification particles irregularly distributed within a 3D shape; and recognition means for recognizing a positional value and a characteristic value of the identification particles distributed in the random type recognition object from one or a plurality of directions on an orthogonal coordinate.

Furthermore, according to the present invention, there is provided a product authentication system in which a purchaser determines whether a purchased product is genuine through a network, including: a recognition apparatus for allowing the purchaser to recognize a characteristic value from an recognition object that is distributed together with a product in order to determine whether the product is genuine; an authentication database for storing a data of the recognition object containing information on a product inputted by a seller and an authentication-processing result; and an authentication server connected to the recognition apparatus through a network, wherein if the purchaser transmits the data of the recognition object recognized by the recognition apparatus through the network in order to make requests for determining whether the product purchased by the purchaser is genuine, the authentication server compares the data of the recognition object and the data stored in the authentication database and transmits information of a product coincident with the data of the recognition object.

Furthermore, according to the present invention, there is provided a product authentication method in which a purchaser determines whether a purchased product is genuine through a network using an authentication system connected to the purchaser, including the steps of: (a) generating a recognition object distributed together with the product so that the recognition object has a characteristic value; (b) allowing a seller to recognize the characteristic value of the recognition object using a recognition apparatus, assign information on the product to the recognition object, store the characteristic value held by the recognition object and the information on the product assigned to the recognition object and then input those information to the authentication system; (c) allowing the purchaser to recognize the characteristic value from the recognition object distributed together with the product using the recognition apparatus in order to determine whether a purchased product is genuine; (d) allowing the purchaser to transmit data of the recognition object recognized by the recognition apparatus to the authentication system through the network in order to make requests for determining whether the product is genuine; and (e) allowing the authentication system to compare the data of the recognition object received through the network with the stored data to search information on the product coincident with the data of the recognition object and then transmit the information on the product.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

The present invention will now be described in detail in connection with preferred embodiments with reference to the accompanying drawings.

In a random type recognition object for an identification apparatus according to an embodiment of the present invention, identification particles are irregularly distributed within a 3D shape and a positional value and a characteristic value of the identification particles distributed within the 3D shape are recognized from one or a number of directions by means of separate recognition means.

Figure 1:
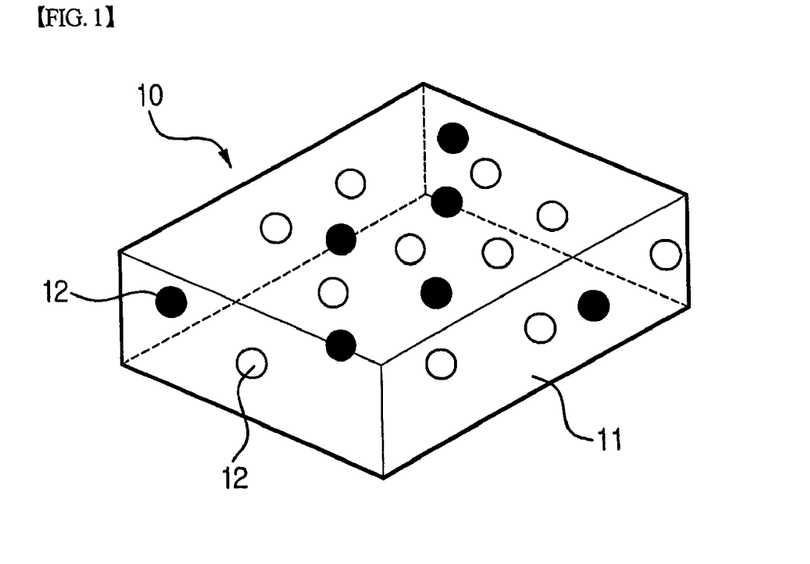
FIG. 1 is a perspective view illustrating a random type recognition object used in a 3D identification apparatus according to an embodiment of the present invention.

As shown in FIG. 1, a number of identification particles 12 are irregularly distributed within a 3D shape recognition object body 11 to form a random type recognition object. In the above, the recognition object body 11 may be formed using a variety of materials such as a synthetic resin such as plastic or a glass material. The recognition object body 11 may be transparent or opaque. It is preferred that the recognition object body 11 is formed using a transparent material. The identification particles 12 inserted into the random type recognition object body 11 may be formed using the same material as the recognition object body 11 and may have a spherical shape or a regular hexahedron shape. In addition, the size of the identification particles 12 may be several micrometers (μm) to several millimeters (mm). The number and size of the identification particles 12 may be dependent on accuracy and importance required in the recognition object.

Furthermore, the size and shape of the random type recognition object may be various such as a plate shape such as a credit card or a pole shape. In reality, the random type recognition object may be various such as an attachment type and an independent type even when the recognition object is used.

An exemplary process of producing the random type recognition object using a synthetic resin as the recognition object body 11 will now be described.

The recognition object body 11 is first melted so that the identification particles 12 to be inserted into the recognition object body 11 can fluctuate freely. If the identification particles 12 are inserted into the recognition object body and are then well stirred, the inserted identification particles 12 are irregularly distributed within the recognition object body 11. In this state, if the recognition object body 11 containing the identification particles 12 is solidified, the random type recognition object in which the identification particles 12 are irregularly distributed is completed.

Meanwhile, it is possible that additional identification particles 12 are inserted into the recognition object body 11, the melted recognition object body 11 is stirred and bubbles generated in this process are used as the identification particles 12. That is, a synthetic resin constituting the body is solidified in a state where bubbles exist. In this case, irregularity in distribution and shape of the identification particles 12 increases to make reproduction further impossible.

Figure 2:
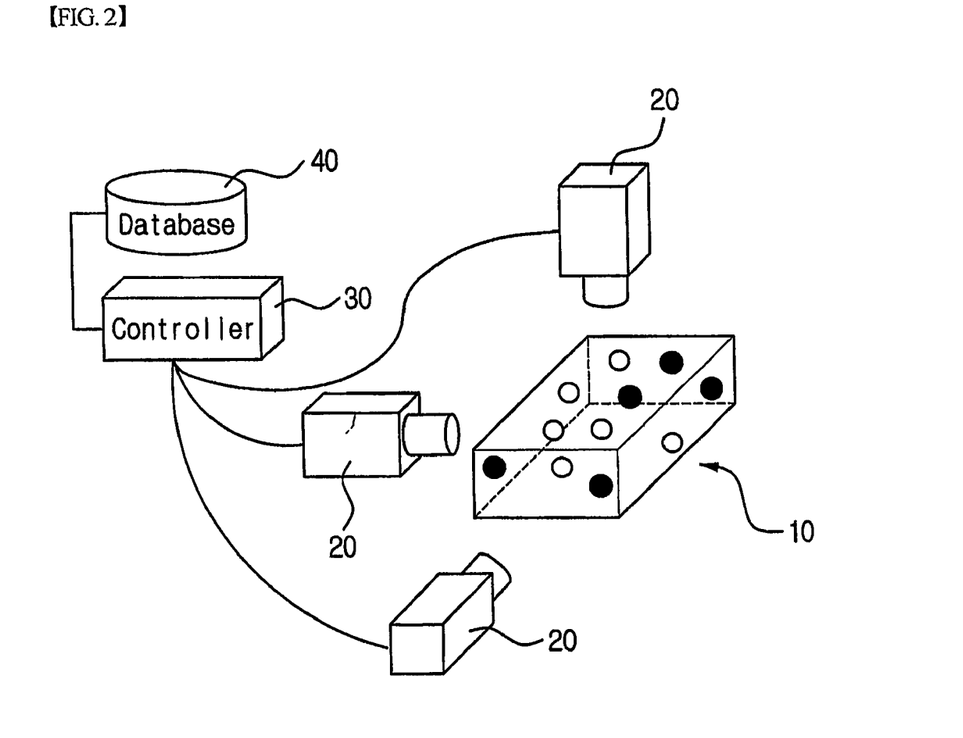
FIG. 2 shows the construction of the 3D identification apparatus according to an embodiment of the present invention.

As shown in FIG. 2, the 3D identification apparatus according to an embodiment of the present invention includes a random type recognition object 10 having the identification particles 12 irregularly distributed within the 3D shape, and recognition means 20 for recognizing a positional value of the identification particles 12 distributed within the random type recognition object from one or a number of directions on an orthogonal coordinate.

In the random type recognition object constructed above, the positional value of the identification particles 12 is perceived by the separate recognition means 20, as shown in FIG. 2. In the random type recognition object, the position of the identification particles 12 is recognized from one or a number of directions by means of the recognition means 20. There is shown in FIG. 2 that the identification particles 12 within the random type recognition object are recognized in three directions on the orthogonal coordinate to obtain a 3D positional value.

In the concrete, as shown in FIG. 2, information such as the positional value of the identification particles obtained through the recognition means 20 is used to complete a data set by means of a controller 30 and is then stored in an additional database 40. The data stored in the database 40 is used to authenticate identity or determine whether a product is genuine.

In order for the recognition means 20 to exactly recognize the identification particles 12 within the random type recognition object, it is necessary to keep constant a relative position of the recognition means 20 and the random type recognition object 10.

It is, however, impossible to keep the relative position of the recognition means 20 and the random type recognition object 10 constant. There is always variation in the relative position of the recognition means 20 and the random type recognition object 10. Even in case of the same random type recognition object, a positional value of the identification particles 12 that is recognized each time is different.

Therefore, a predetermined index is set every random type recognition object and a positional value of the recognized identification particles 12 is corrected based on the set index. Thus, although a relative position of the recognition means 20 and the random type recognition object 10 varies, constant positional value information can be obtained.

Such an index may become some of the shape itself forming the random type recognition object 10. A plurality of solid lines or a triangle orthogonal to or in parallel to a predetermined location on an outer surface of the random type recognition object may be prepared and used as an index.

If the index is prepared, the relative position of the recognition means 20 and the random type recognition object 10 is corrected. Expansion and reduction of the random type recognition object 10 depending on a difference in temperature is also corrected.

In the 3D identification apparatus according to another embodiment of the present invention, the recognition means 20 is an image recognition apparatus. That is, images recognized in a number of directions on an orthogonal coordinate are acquired by means of an image recognition apparatus such as a CCD camera. The acquired images of the recognition object 10 are combined to form a 3D positional value of the identification particles 12.

Figure 3:
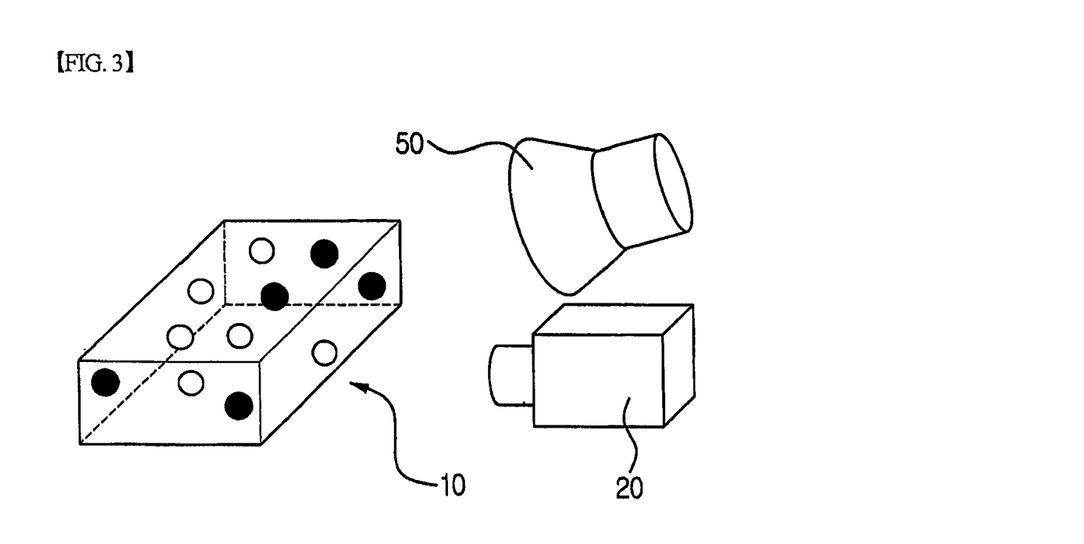
FIG. 3 is a schematic view illustrating reflect type recognition means of the 3D identification apparatus according to an embodiment of the present invention.
Figure 4:
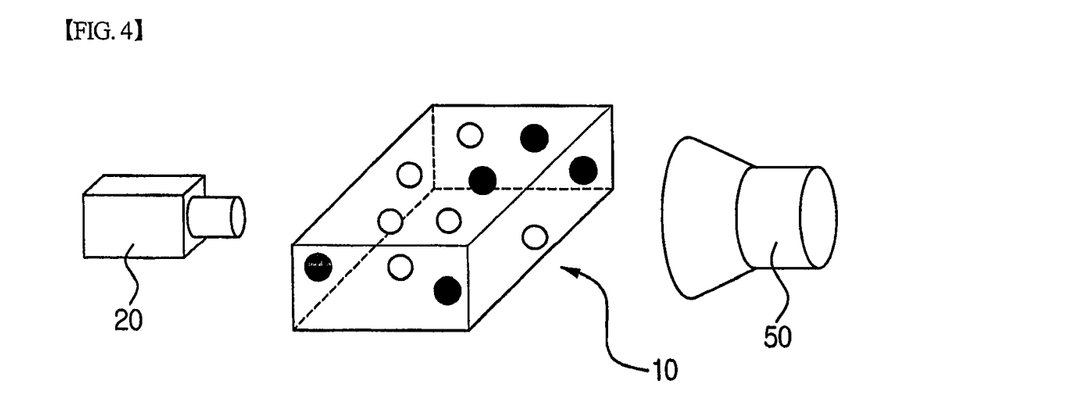
FIG. 4 is a schematic view illustrating passage type recognition means of the 3D identification apparatus according to an embodiment of the present invention.

At this time, resolution of the image recognition apparatus is determined depending on the size of the identification particles 12 within the recognition object. There are two methods for recognizing images. The first method is a reflect type method in which light is illuminated by an illumination means 50 in the same direction as the image recognition apparatus, as shown in FIG. 3. The second method is a passage type method in which light is illuminated by the illumination means 50 in the direction opposite to the image recognition apparatus and images that pass through the recognition object are acquired, as shown in FIG. 4.

It is required that the image recognition apparatus can acquire very accurate images.

However, an optical lens used in the image recognition apparatus may have some variation in its manufacture process.

Therefore, all image recognition apparatuses could not acquire the same image. Thus, each of the image recognition apparatuses has a correction value on which a distorted image is corrected after the apparatus is manufactured.

In other words, the degree that a value of a pole whose length is exactly 1 inch recognized and outputted by the image recognition apparatus is deviated from 1 inch is calculated. A correction value for correcting the calculated value is determined and the determined correction value is stored in the database 40. The stored value is used when each image recognition apparatus is operated.

This method allows more accurate authentication to be possible and a correction value itself defined every image recognition apparatus may be used as one security means.

Also, a laser detector may be used as the recognition means 20.

That is, the laser detector senses a laser beam that goes straight ahead in a given direction, collides against the identification particles 12 and then reflects from the particles 12. The laser detector measures the distance of the identification particles 12.

To obtain the positional value of the identification particles 12 within the recognition object using the recognition means 20 is made possible by a method for obtaining a 3D positional value of each of the identification particles 12 and for using only the relative positional value in three directions on the orthogonal coordinate. In other words, the position of each of the identification particles 12 on a x-y plane, the position of each of the identification particles 12 on a y-z plane, and the position of each of the identification particles 12 on a z-x plane are acquired and positional values on the respective planes are combined to produce the last positional value.

In this case, the process for calculating the 3D positional value of each of the identification particles 12 is omitted. Thus, a simple recognition apparatus can be used. In this case, it is safe to use the reflect type method.

Moreover, in a 3D identification apparatus according to still another embodiment of the present invention, recognition means 20 recognizes not only a positional value of the identification particles 12 but also a characteristic value of the identification particles 12.

That is, not only the positional value of each of the identification particles 12 but also an eigen visual characteristic value such as color and shape of the identification particles 12 or a magnetic characteristic value such as magnetism in each of the identification particles 12, and an optical characteristic value such as reflectivity are additionally recognized. As the positional value and the characteristic value of the identification particles 12 are recognized at the same, a more accurate identification apparatus is provided.

Figure 5:
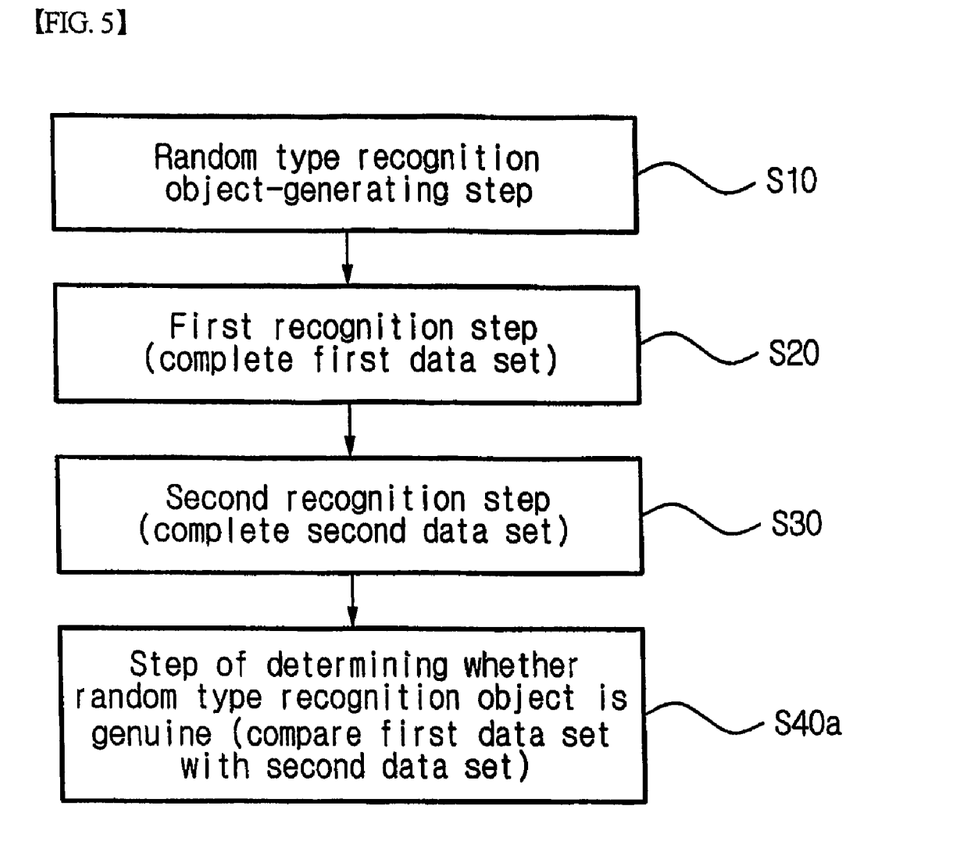
FIG. 5 is a flowchart illustrating steps for implementing an identification method using the 3D identification apparatus according to an embodiment of the present invention.

Referring to FIG. 5, an identification method using a 3D identification apparatus according to another embodiment of the present invention includes a step of generating a random type recognition object (S10) wherein a random type recognition object having identification particles 12 irregularly distributed within a 3D shape is completed; a first recognition (S20) wherein a positional value and a characteristic value on an orthogonal coordinate of the identification particles 12 within the random type recognition object produced in the random type recognition object-generating step are recognized from one or a number of directions on the orthogonal coordinate to complete a first data set; a second recognition step (S30) wherein the positional value and the characteristic value on the orthogonal coordinate of the identification particles 12 distributed within the random type recognition object in which the first data set is completed in the first recognition step are recognized from one or a number of directions on the orthogonal coordinate to complete a second data set; and a step of determining whether the random type recognition object is genuine (S40$a$) by determining whether the first data set completed in the first recognition step and the second data set completed in the second recognition step are coincident with each other.

In the concrete, as shown in FIG. 5, in the method for determining whether the random type recognition object is genuine, the random type recognition object-generating step (S10) is a step of producing the random type recognition object by means of the aforementioned method.

The first recognition step (S20) is a step for extracting various information on the identification particles 12 from the random type recognition object completed by the recognition means 20. In this step, a positional value and a characteristic value of the identification particles 12, or the first data set consisting of images recognized in each direction by means of the recognition means 20 are completed. If the first data set completed thus is additionally stored in the aforementioned database and the second data set is completed, it is determined whether the two data sets are coincident with each other. Thus, they are used to determine whether a recognition object is genuine.

As such, the random type recognition object whose eigen data set is completed can serve as a recognition object representing position, authority, existence or the like. For example, a person who holds a recognition object whose first data set is completed can have his identity, position and existence validated by presenting his recognition object at a place where other recognition means 20 is provided.

In other words, a person who wants to validate identity of a recognition object holder or determine whether the recognition object is genuine completes a second data set by recognizing the random type recognition object 10 presented by the holder based on only the positional value of the identification particles 12 inserted into the recognition object or recognizing the positional value and the characteristic value of the identification particles 12 at the same time, in the same method as that in which the first data set is written using other recognition means 20. It is determined whether the second data set completed thus is coincident with the first data set that is separately stored.

Figure 6:
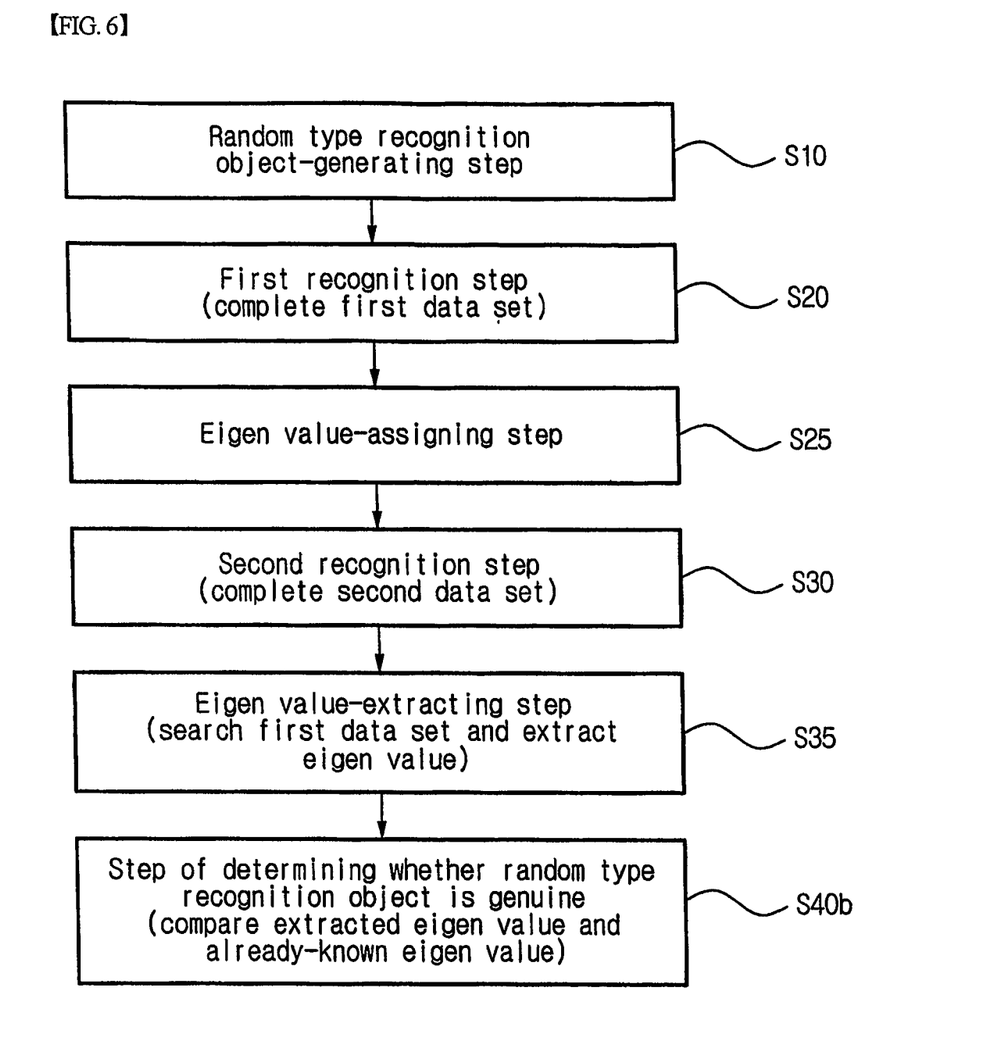
FIG. 6 is a flowchart illustrating steps for implementing an identification method using the 3D identification apparatus according to another embodiment of the present invention.

The identification method using the 3D identification apparatus according to still another embodiment of the present invention further includes an eigen value-assigning step (S25) of assigning an eigen value to the first data set completed in the first recognition step and storing the assigned eigen value, and an eigen value-extracting step (S35) of searching a first data set coincident with the second data set completed in the second recognition step and extracting the eigen value assigned to the first data set whose data sets are coincident with each other. The step of determining whether the random type recognition object is genuine includes the step of comparing the eigen value extracted in the eigen value-extracting step with an eigen value that is already known to determine whether the random type recognition object is genuine (S40$b$).

In other words, an additional eigen value is assigned to the first data set completed in the first recognition step (S20). This can be explained as follows.

In the event the random type recognition object of the present invention is to be used in the identification method for validating identity, personal information such as the name is matched to the first data set to assign a corresponding eigen value. It is assumed that the name is assigned to the first data set as the corresponding eigen value. If a user (a person whose identity will be validated) informs his name and presents his recognition object, a person who validates the identity of the user extracts a data set from the presented recognition object, extracts a matching data set from a data set already stored and a corresponding eigen value (for example, the name of a person whose identity will be validated) and then determines whether the name of the person whose identity will be validated and the extracted name are coincident.

A serial number of a product may be set as an eigen value in addition to the name for validating identity. In this case, it is possible to determine whether the product is genuine by comparing an eigen value extracted from a recognition object and a serial number displayed on the product.

In case where the random type recognition object and the eigen value are matched one by one, there is an advantage in that all functions provided by a conventional recognition apparatus using a corresponding eigen value can be employed.

For example, in the event that information corresponding to a credit card number or an ATM number is matched in a recognition object as an eigen value, the recognition object can be used as a credit card or an ATM card whose reproduction is impossible.

Furthermore, it is possible to use the recognition object of the present invention instead of an electronic key having built an IC chip in.

In addition, the product authentication system and method according to the present invention may be used to adequately determine whether products such as a watch, a handbag, foreign wine and golf goods are genuine.

A method for determining whether a product purchased by a purchaser is genuine by means of the product authentication system according to the present invention will now be described in connection with preferred embodiments with reference to the accompanying drawings.

Figure 7:
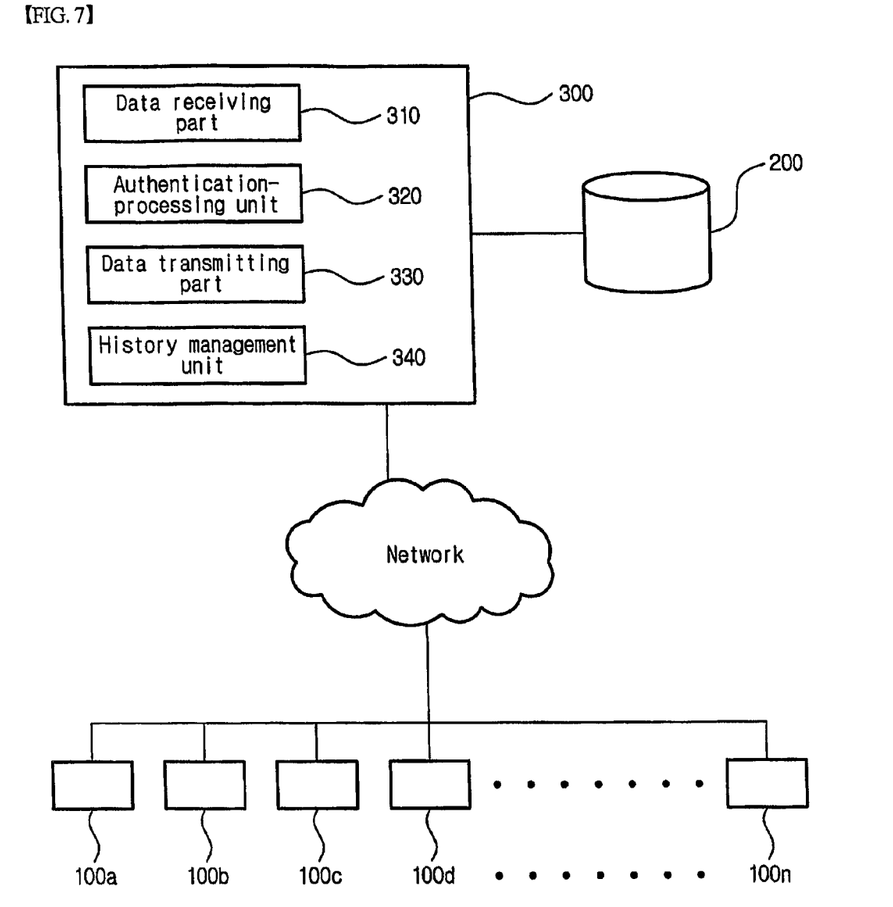
FIG. 7 is a block diagram illustrating the construction of a product authentication system according to an embodiment of the present invention.

FIG. 7 is a block diagram illustrating the construction of the product authentication system according to an embodiment of the present invention.

Referring to FIG. 7, the product authentication system according to a preferred embodiment of the present invention includes recognition apparatuses 100a, 100b . . . 100n, an authentication database 200 and an authentication server 300. The authentication server and the authentication database are connected to the recognition apparatuses through a network. The network may include the Internet, a telephone network, wired/wireless communication networks, etc. and may refer to a communication network through which data can be exchanged. It is preferred that the authentication server 300 includes a data receiving part 310, an authentication-processing unit 320 and a data transmitting part 330. It is more preferable that the authentication server 300 further includes a history management unit 340.

Figure 8:
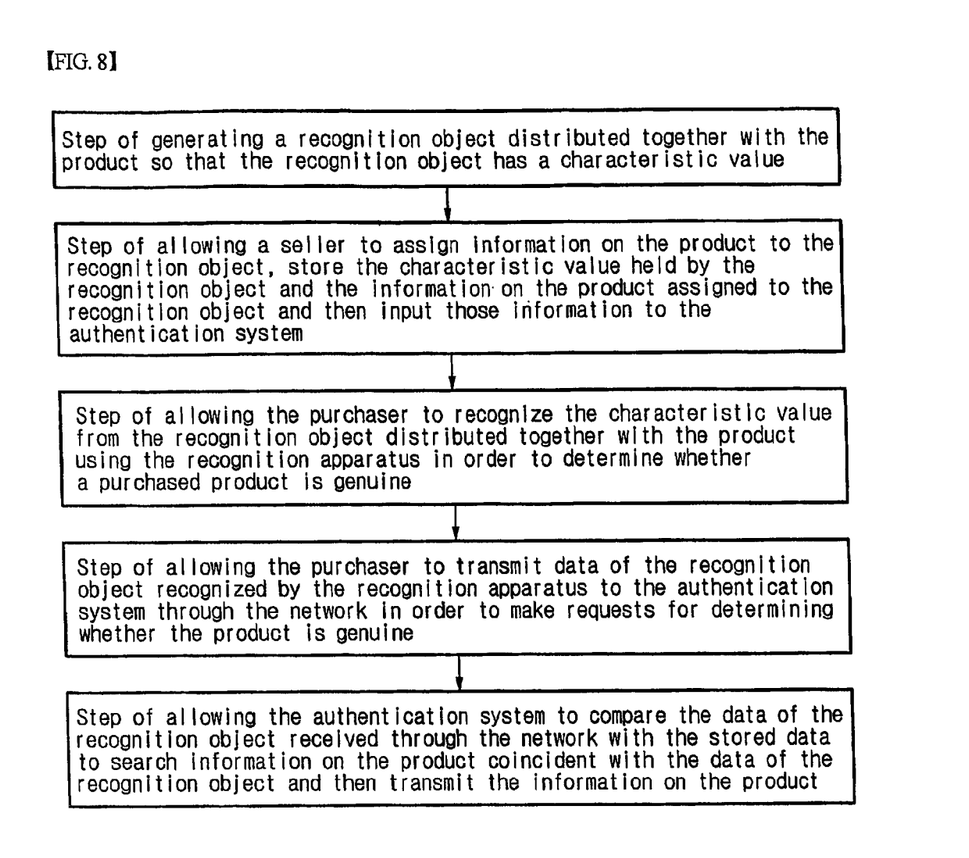
FIG. 8 is a flowchart illustrating a product authentication method according to an embodiment of the present invention.

FIG. 8 is a flowchart illustrating a product authentication method according to an embodiment of the present invention.

The product authentication method according to the present invention includes allowing a purchaser to transmit data extracted from a recognition object and distributed together with a product to an authentication system using a recognition apparatus in order to determine whether a purchased product is genuine, allowing the authentication system to transmit information on the product coincident with the received data to the purchaser, and allowing the purchaser to determine whether the information on the purchased product and the product information received from the authentication system are coincident with each other, thus determining whether the product is genuine. The product authentication method performed within the product authentication system will be described by each step with reference to FIG. 8.

(1) Step of Generating Recognition Object

A recognition object distributed together with a product is produced to have various physical characteristic values. It is preferred that the recognition object has identification particles irregularly distributed within a 3D shape, and is a recognized random type recognition object in which a positional value and a characteristic value of the identification particles distributed within the 3D shape is recognized from one or a number of direction by means of the recognition apparatus. This random type recognition object can be easily fabricated and cannot be reproduced. Thus, this recognition object can be preferably used in the product authentication system and method according to the present invention.

FIG. 1 is a perspective view illustrating a random type recognition object used in a 3D identification apparatus according to an embodiment of the present invention.

Referring to FIG. 1, in the recognition object according to the present invention, a number of the identification particles 12 are irregularly distributed within the 3D shape recognition object body 11 to form the random type recognition object. At this time, the recognition object body 11 may be formed using various materials such as a synthetic resin like plastic or a glass material. The recognition object body 11 may be transparent or opaque. It is preferred that the recognition object body 11 is formed using a transparent material. The identification particles 12 inserted into the random type recognition object body 11 may be formed using the same material as the recognition object body 11 and may have a spherical shape or a regular hexahedron shape. In addition, the size of the identification particles 12 may be several micrometers (μm) to several millimeters (mm). The number and size of the identification particles 12 may be dependent on accuracy and importance required in the recognition object. Furthermore, the size and shape of the random type recognition object may be various such as a plate shape such as a credit card or a pole shape. In reality, the random type recognition object may be various such as an attachment type and an independent type even when the recognition object is used.

An exemplary process of producing the random type recognition object using a synthetic resin as the recognition object body 11 will now be described. The recognition object body 11 is first melted so that the identification particles 12 to be inserted into the recognition object body 11 can fluctuate freely. If the identification particles 12 are inserted into the recognition object body and are then well stirred, the inserted identification particles 12 are irregularly distributed within the recognition object body 11. In this state, if the recognition object body 11 containing the identification particles 12 is solidified, the random type recognition object in which the identification particles 12 are irregularly distributed is completed.

Meanwhile, additional identification particles 12 are not inserted into the recognition object body 11, the melted recognition object body 11 is stirred, and bubbles generated in this process may be used as the identification particles 12. That is, a synthetic resin constituting the body is solidified in a state where bubbles exist. In this case, irregularity in distribution and shape of the identification particles 12 is increased to make reproduction further impossible.

(2) Input Step

A seller assigns information on a product to a recognition object, stores an eigen characteristic value held by the recognition object and the information on the product assigned to the recognition object, and then inputs these information to an authentication system. The information on the product may include information on the type of a product, a manufacturer, a seller, a serial number, the shape of the product, an authentication code and so on. This information on the product is assigned to the eigen characteristic value held by the recognition object, inputted to the authentication system by means of the seller and then stored in the authentication database 300.

In other words, if information on a product is an authentication code, a seller extracts an eigen characteristic value held by a recognition object using a recognition apparatus, assigns a unique authentication code of the product to the extracted characteristic value and then inputs it to the authentication database 200 of the authentication system. A purchaser extracts the eigen characteristic value held by the recognition object using the recognition apparatus in order to determine whether a purchased product is genuine, and then transmits the value to the authentication system. The authentication-processing unit 320 of the authentication system searches an authentication code coincident with the eigen characteristic value data held by the recognition object, and the data transmitting part 330 of the authentication system transmits the authentication code to the purchaser. Then, the purchaser compares the authentication code of the purchased product and the authentication code received from the authentication system to determine whether the product is genuine.

In this input step, it is preferred that the characteristic value held by the recognition object is extracted by recognizing the positional value and the characteristic value of the identification particles within the random type recognition object from one or a number of directions on the orthogonal coordinate. Moreover, the recognition apparatus is a 3D identification apparatus. It is preferable that the recognition apparatus includes a random type recognition object having identification particles distributed irregularly within a 3D shape, and recognition means for recognizing a positional value of the identification particles distributed in the random type recognition object from one or a number of directions on the orthogonal coordinate.

FIG. 2 shows the construction of the 3D identification apparatus according to an embodiment of the present invention. In the random type recognition object that is produced to have the characteristic value, the positional value of the identification particles 12 that is the characteristic value of the recognition object is perceived by separate recognition means 20, as shown in FIG. 2. In the random type recognition object, the position of the identification particles 12 is recognized from one or a number of directions by means of the recognition means 20. Generally, the identification particles 12 within the random type recognition object are recognized from two directions on the orthogonal coordinate to obtain a 3D positional value.

There is shown in FIG. 2 that the identification particles 12 within the random type recognition object are recognized from three directions on the orthogonal coordinate to obtain a 3D positional value. That is, images recognized from two directions on an orthogonal coordinate are acquired using an image recognition apparatus such as a CCD camera and the acquired images of the recognition object are combined to produce the 3D positional value of the identification particles 12.

At this time, resolution of the image recognition apparatus is determined depending on the size of the identification particles 12 within the recognition object. There are two methods for recognizing images. The first method is a reflect type method in which light is illuminated by illumination means 50 in the same direction as the image recognition apparatus, as shown in FIG. 3. The second method is a passage type method in which light is illuminated by illumination means 50 in the direction opposite to the image recognition apparatus and images that pass through the recognition object are acquired, as shown in FIG. 4.

Also, a laser detector may be used as the recognition means 20.

To obtain the positional value of the identification particles 12 within the recognition object using the recognition means 20 is made possible by a method for obtaining a 3D positional value of each of the identification particles 12 and for using only the relative positional value in three directions on the orthogonal coordinate. In other words, the position of each of the identification particles 12 on a x-y plane, the position of each of the identification particles 12 on a y-z plane, and the position of each of the identification particles 12 on a z-x plane are acquired and positional values on the respective planes are combined to produce the last positional value.

In this case, a process for calculating a 3D positional value of each of the identification particles 12 is omitted. Thus, a simple recognition apparatus can be used. In this case, it is safe to use the reflect type method.

Moreover, in the 3D identification apparatus according to still another embodiment of the present invention, the recognition means 20 recognizes not only the positional value of the identification particles 12 but also the characteristic value of the identification particles 12. That is, not only the positional value of each of the identification particles 12 but also an eigen visual characteristic value such as color and shape of the identification particles 12 or a magnetic characteristic value such as magnetism in each of the identification particles 12, and an optical characteristic value such as reflectivity are additionally recognized. As the positional value and the characteristic value of the identification particles 12 are recognized at the same time, a more accurate identification apparatus is provided.

(3) Extraction Step

A purchaser purchases a product, extracts and recognizes a characteristic value from a recognition object that is distributed together with the product using a recognition apparatus in order to determine whether the purchased product is genuine. The recognition apparatus may be installed at a place where products are sold, a special place where services for determining whether products are genuine are provided, etc. A purchaser may have the recognition apparatus as a computer peripheral device.

In this input step, it is preferred that the characteristic value held by the recognition object is extracted by recognizing the positional value and the characteristic value of the identification particles within the random type recognition object from one or a number of directions on the orthogonal coordinate. Moreover, the recognition apparatus is a 3D identification apparatus. It is preferable that the recognition apparatus includes a random type recognition object having identification particles irregularly distributed within a 3D shape, and recognition means for recognizing the positional value of the identification particles distributed in the random type recognition object from one or a number of directions on the orthogonal coordinate.

(4) Step of Making Requests for Determining Whether Product is Genuine

In order to determine whether a product to be purchased is genuine, a purchaser transmits a data of a recognition object recognized by the recognition apparatus to the authentication system through the network including the Internet. The purchaser transmits the recognition object data extracted by the recognition apparatus to the data receiving part 310 through the network. In the concrete, if the purchaser recognizes a positional value and a characteristic value of identification particles distributed in a random type recognition object using the recognition apparatus and then transmits those values to the authentication system, the data receiving part 310 receives the values.

(5) Step of Transmitting Determination Results

The authentication-processing unit 320 compares the data of the recognition object received from the data receiving part 310 and the data stored in the authentication database 200 to search information on the product, which is coincident with the received data of the recognition object. The data transmitting part 330 transmits the information on the product that is searched from the authentication-processing unit 320 to the product purchaser. In the concrete, the authentication-processing unit 320 compares the data of the recognition object that is received from the data receiving part with the data stored in the authentication database to extract product information coincident with the data. That is, a seller extracts the characteristic value from the recognition object and searches information on the product assigned to the recognition object. The data transmitting part 330 transmits the information to the purchaser.

The product authentication system according to the present invention further includes a history management unit for having a history received from a data transmitting part stored in the authentication database. If it was determined whether a product was genuine in the past, it is preferred that the past history is provided to the purchaser. The history management unit has the history transmitted to the purchaser by the data transmitting part 330 stored in the authentication database 200. Thus, the purchaser can receive an existing determination history in addition to the information on the purchased product.

The recognition object has an index assigned thereto. Thus, in order to make requests for determining whether a product purchased by the purchaser is genuine, if a data and an index of the recognition object that are recognized by the recognition apparatuses 100a, 100b, . . . 100n are transmitted to the authentication system through the network, the authentication-processing unit 320 of the authentication system searches a data of the recognition object that is coincident with the index received through the network and determines whether the searched data of the recognition object and the data of the recognition object received through the network are coincident with each other. The data transmitting part 330 of the authentication server transmits the results so that the processing speed and overload of the authentication-processing unit are reduced.

It is preferred that the index may have characters such as barcode, RFID, an electronic chip, numbers and alphabets and may be displayed on a recognition object. In other words, a seller recognizes the characteristic value of the recognition object using the recognition apparatuses 100a, 100b, . . . 100n, assigns information on a product and an index of the recognition object to the recognition object, makes data the characteristic value held by the recognition object, the information on the product assigned to the recognition object and the index of the recognition object, inputs them to the authentication system, and then stores these information in the authentication database 200.

If the purchaser transmits the data of the recognition object recognized by the recognition apparatuses 100a, 100b, . . . 100n and the index of the recognition object to the authentication system through the network in order to determine whether the purchased product is genuine, the data receiving part 310 of the authentication system receives those data. The authentication-processing unit 320 searches a data of the recognition object that is coincident with the index transmitted through the network, determines whether the searched data of the recognition object and the data of the recognition object received through the network are coincident with each other. The data transmitting part 330 transmits the determination result to the purchaser.

If whether a product is genuine is performed at the request of a purchaser, there may be further included a settlement process in which payment through a credit card is made in order to pay the price of the authentication system.

INDUSTRIAL APPLICABILITY

As described above, a 3D identification apparatus and identification method using the same according to embodiments of the present invention have the following effects.

Firstly, it is possible to exactly validate identity of a user and to determine whether a product is genuine.

Secondly, reproduction of a recognition object is impossible. It is thus possible to construct more complete security equipment and validation system.

Lastly, according to a product authentication system and method, it is possible to easily determine whether a product is genuine through a network. The recognition object can be easily fabricated and cannot be reproduced. It is thus possible to protect a consumer from an imitation and to establish a business transaction order.

What is claimed is:

1. An identification method using a random type recognition object, comprising:

a step of generating a random type recognition object wherein the random type recognition object having identification particles irregularly distributed within a 3D shape is completed;

a first recognition step wherein a positional value and a characteristic value on an orthogonal coordinate of the identification particles within the random type recognition object produced in the random type recognition object-generating step are recognized from one or a number of directions on the orthogonal coordinate to complete a first data set;

a second recognition step wherein the positional value and the characteristic value on the orthogonal coordinate of the identification particles distributed within the random type recognition object in which the first data set is completed in the first recognition step are recognized from one or a number of directions on the orthogonal coordinate to complete a second data set; and a step of determining whether the random type recognition object is genuine by determining whether the first data set completed in the first recognition step and the second data set completed in the second recognition step are coincident with each other, further comprising:

an eigen value-assigning step of assigning an eigen value to the first data set completed in the first recognition step and storing the assigned eigen value; and an eigen value-extracting step of searching a first data set coincident with the second data set completed in the second recognition step and extracting the eigen value assigned to the first data set whose data sets are coincident with each other, wherein the step of determining whether the random type recognition object is genuine includes the step of comparing the eigen value extracted in the eigen value-extracting step with an eigen value that is already known to determine whether the random type recognition object is genuine.

2. A product authentication system wherein a purchaser determines whether a purchased product is genuine through a network, comprising: a recognition apparatus for allowing the purchaser to recognize a characteristic value from an recognition object that is distributed together with a product in order to determine whether the product is genuine; an authentication database for storing a data of the recognition object containing information on a product inputted by a seller and an authentication-processing result; and an authentication server connected to the recognition apparatus through a network, wherein if the purchaser transmits the data of the recognition object recognized by the recognition apparatus through the network in order to make requests for determining whether the product purchased by the purchaser is genuine, the authentication server compares the data of the recognition object with the data stored in the authentication database and then transmits information on a product coincident with the data of the recognition object, wherein the recognition object is a random type recognition object in which identification particles are irregularly distributed within a 3D shape, and a positional value and a characteristic value of the identification particles distributed within the 3D shape are recognized from one or a plurality of directions by means of the recognition apparatus, and wherein the recognition apparatus is a 3D identification apparatus and comprises: a random type recognition object having identification particles irregularly distributed within a 3D shape; and recognition means for recognizing a positional value of the identification particles distributed in the random type recognition object from one or a plurality of directions on an orthogonal coordinate.

3. The product authentication system as claimed in claim 2, wherein the authentication server comprises:
   a data receiving part that receives the data of the recognition object recognized by the recognition apparatus, from the purchaser;
   an authentication-processing unit that compares the data of the recognition object received from the data receiving part with the data stored in the authentication database to search information on a product coincident with the data of the recognition object; and
   a data transmitting part that transmits the information on the product searched by the authentication-processing unit to the purchaser.

4. The product authentication system as claimed in claim 3, further comprising a history management unit that has a history received from the data transmitting part stored in the authentication database.

5. A product authentication method in which a purchaser determines whether a purchased product is genuine through a network using an authentication system connected to the purchaser, comprising the steps of:
   (a) generating a recognition object distributed together with the product so that the recognition object has a characteristic value;
   (b) allowing a seller to recognize the characteristic value of the recognition object using a recognition apparatus, assign information on the product to the recognition object, store the characteristic value held by the recognition object and the information on the product assigned to the recognition object and then input those information to the authentication system;
   (c) allowing the purchaser to recognize the characteristic value from the recognition object distributed together with the product using the recognition apparatus in order to determine whether the purchased product is genuine;
   (d) allowing the purchaser to transmit a data of the recognition object recognized by the recognition apparatus to the authentication system through the network in order to make requests for determining whether the product is genuine; and
   (e) allowing the authentication system to compare the data of the recognition object received through the network with the stored data to search information on the product coincident with the data of the recognition object and then transmit the information on the product,
   wherein the step (a) comprises generating a random type recognition object in which identification particles are irregularly distributed within a 3D shape, and a positional value and a characteristic value of the identification particles distributed within the 3D shape are recognized from one or a plurality of directions by means of the recognition apparatus,
   wherein the step (b) comprises recognizing a positional value and a characteristic value of identification particles within the random type recognition object produced in the step (a) from one or a plurality of directions on an orthogonal coordinate,
   wherein the step (c) comprises recognizing a positional value and a characteristic value of identification particles within the random type recognition object produced in the step (a) from one or a plurality of directions on an orthogonal coordinate,
   wherein the recognition apparatus is a 3D identification apparatus and comprises: a random type recognition object having identification particles irregularly distributed within a 3D shape; and recognition means for recognizing a positional value of the identification particles distributed in the random type recognition object from one or a plurality of directions on an orthogonal coordinate.

6. The product authentication method as claimed in claim 5, further comprising the step of storing the transmitted history in the authentication system.

7. The product authentication method as claimed in claim 5, wherein the recognition object has an index assigned thereto, and if the purchaser transmits the data of the recognition object recognized by the recognition apparatus and its index to the authentication system through the network in order to make requests for determining whether the purchased product is genuine, the authentication system searches data of the recognition object that is coincident with the index received through the network to determine whether the searched data of the recognition object and the data of the recognition object received through the network are coincident with each other and then transmits the determination result.

8. The product authentication method as claimed in claim 5, further comprises the step of allowing a purchaser to pay the price of using the authentication system.

9. A random type recognition object for an identification apparatus, wherein identification particles are irregularly distributed within a 3D shape, and a positional value and a characteristic value of the identification particles distributed within the 3D shape are recognized from one or a plurality of directions by means of separate recognition means.

10. A 3D identification apparatus using a random type recognition object, comprising:
   a random type recognition object having identification particles irregularly distributed within a 3D shape; and
   recognition means for recognizing a positional value of the identification particles distributed in the random type recognition object from one or a plurality of directions on an orthogonal coordinate,
   wherein the recognition means recognizes the positional value of the identification particles and a characteristic value of the identification particles at the same time, and
   wherein the recognition means recognizes the positional value of the identification particles and a characteristic value of the identification particles at the same time.

11. The 3D identification apparatus as claimed in claim 10, wherein the recognition means is an image recognition apparatus or a laser detector.

* * * * *